W. B. THOMPSON.
FLUID CONTROLLING VALVE MECHANISM.
APPLICATION FILED NOV. 28, 1910.
1,001,324.
Patented Aug. 22, 1911.
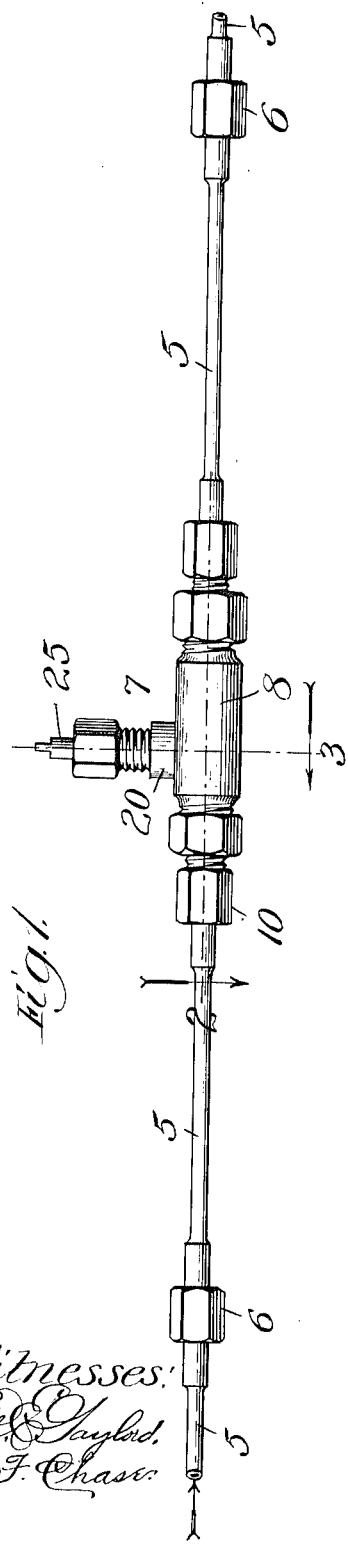
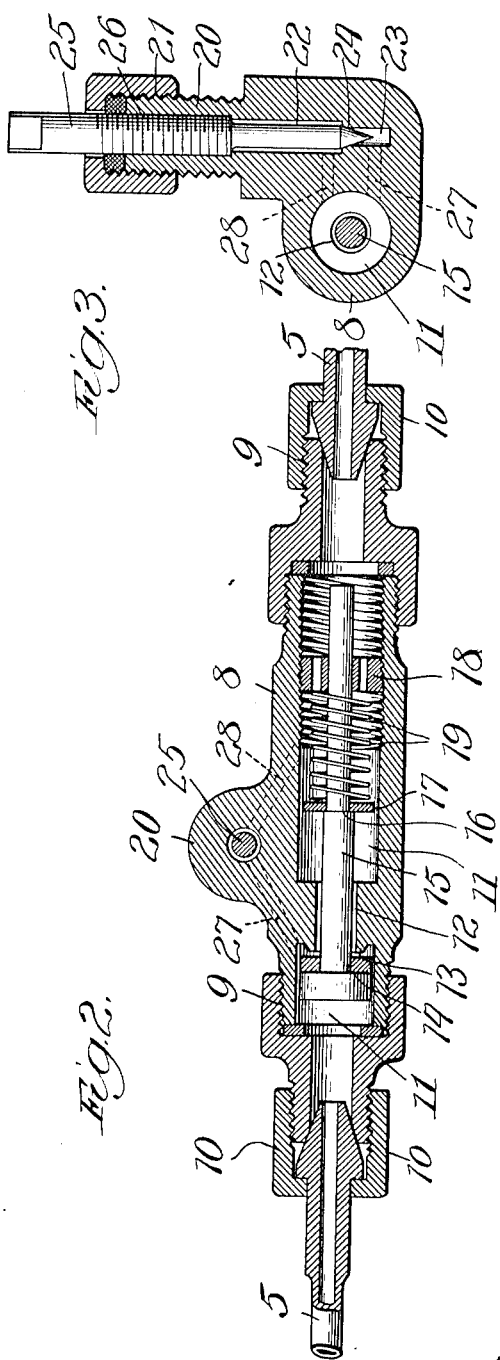
Witnesses:
Inventor.
William B. Thompson,

UNITED STATES PATENT OFFICE.

WILLIAM B. THOMPSON, OF CHICAGO, ILLINOIS, ASSIGNOR TO ACORN BRASS MANUFACTURING COMPANY, OF CHICAGO, ILLINOIS, A CORPORATION OF ILLINOIS.

FLUID-CONTROLLING VALVE MECHANISM.

1,001,324.     Specification of Letters Patent.     Patented Aug. 22, 1911.

Application filed November 28, 1910. Serial No. 594,457.

*To all whom it may concern:*

Be it known that I, WILLIAM B. THOMPSON, a citizen of the United States, residing at Chicago, in the county of Cook and State of Illinois, have invented a new and useful Improvement in Fluid-Controlling Valve Mechanism, of which the following is a specification.

My invention relates to improvements in valve-mechanisms for controlling the flow of fluid through conduits in which a back-pressure of fluid always exists under normal conditions, my invention being devised more particularly for use in connection with hollow-wire systems in which gasolene or other hydro-carbon oil is conducted under pressure from a tank, or the like, to burners at which the oil is to be consumed. Systems of this character, as hitherto provided, present the objection of affording no provision for automatically shutting off the flow of oil through the pipes supplying the burner in case the flame at the latter is extinguished accidentally, as by being blown out by the wind, or in the event of breaking of the pipes, with the result of causing the oil to overflow at the burner, or from the break in the pipe, as the case may be, with a consequent loss and danger.

My object is to overcome the objections above stated, and, generally, to provide means in a fluid-conducting conduit for automatically shutting off the flow of fluid through the conduit when the back-pressure therein becomes reduced to a degree below that maintained under normal conditions, and to this end my invention contemplates the interposing in the conduit of valve-devices adapted to be maintained normally open while the flow of oil through the conduit does not exceed the maximum flow under normal conditions; and in the case of a hollow-wire system the interpositioning between the burner or burners and the source of supply, or the location at any other convenient point or points, in the pipes thereof, of valve-devices operating as stated.

Referring to the accompanying drawings, Figure 1, is a view in side elevation of a section of a hollow-wire oil-conducting system equipped with a valve constructed in accordance with my invention; Fig. 2, is an enlarged section taken at the line 2 on Fig. 1, and viewed in the direction of the arrow; and Fig. 3, a section taken at the line 3, on Fig. 1, and viewed in the direction of the arrow.

I have illustrated a portion only of a hollow-wire system, as such systems are well known, and the disclosure of my invention in connection with such a section is deemed to be sufficient. The section illustrated is connected, in practice, with a tank (not shown) containing the oil to be conducted through the system to the burners, and at its opposite end would be connected with a burner, or burners, as the case may be, the section of the system shown comprising pipes 5 connected together by couplings 6 of any suitable construction, and a valve-device 7 interposed in the pipes 5.

The valve-device 7 comprises a casing 8, externally screw-threaded at its opposite ends as represented at 9, at which it screws into couplers 10 connected with the pipes 5. The casing 8 contains a longitudinally-extending bore 11 opening through its opposite ends, this bore being formed with an annular flange 12 near one end of the casing 8, and affording a valve-seat 13. Coöperating with the seat 13 is a valve 14 which loosely fits the bore 11, and extends at its stem 15 through the flange 12 and to within a short distance of the opposite end of the casing, the stem 15 being of less diameter than the opening afforded by the flange 12, whereby oil may readily pass through the bore 11 when the valve 14 is opened as hereinafter described. The stem 15 is shouldered as represented at 16, and carries a washer 17 which fits against the shoulder and against which and an apertured screw-plug 18 screwed into an end of the casing 8, a coil-spring 19 surrounding the stem 15, bears.

It will be observed from the foregoing that the tendency of the spring 19 in expanding is to unseat the valve 14, the tension of this spring being capable of variation by adjusting the plug 18 in the bore 11.

In practice, the oil supplied through the pipes 5 to the burner (not shown) flows under pressure in the direction indicated by the arrow in Fig. 1, and as under normal conditions, said pressure is always in excess of the draw-off at the burners, back pressure in the pipes always exists, the degree of such back pressure depending on the restriction imposed on the flow of oil from the burners. My invention contemplates the utilization of the back pressure referred to as an element in maintaining the valve 14 open, and to this end I so adjust the plug 18 in the casing 8 as to cause the combined force exerted by the spring 19, tending to open the valve 14, and that produced by the back pressure when reduced to the minimum during the operation of the burners, to be greater than the pressure at which the oil is introduced into the system, whereby the valve 14 is held normally away from its seat 13. Thus, so long as the back pressure against the valve 14 remains above a predetermined degree, the valve 14 will remain open and the flow of oil to the burner will be uninterrupted. Should the flame at the burner become extinguished without shutting off the flow of oil thereto, which would cause the flow through the burner to increase in volume as the latter cools, or should the pipe behind the valve 7 become broken or fractured, the back-pressure against the valve 14 would be either entirely eliminated or reduced to such a degree as to be insufficient in conjunction with the force exerted by the spring 19, to overcome the head pressure of the oil, and the valve 14 would, therefore, automatically seat and close the system at that point to the flow of oil beyond the valve 7.

It will be manifest that valves operating like the one just described, may be interposed at any point or points in the pipes of a system. Thus the pipes adjacent to each burner supplied therefrom may be equipped with these valves and, if desired, the pipes of the system may contain any suitable number of such valves for automatically shutting off the flow of oil from the pipes in case of impairment of the latter, as for example, in the case of fire.

Should the valve 14 become seated, because of undue reduction in back pressure, it is necessary, in order that the flow of oil through the portion of a system controlled by such valve, be resumed, that such back pressure be again created beyond the valve 14. To accomplish this I provide the valve 14 with a laterally-extending boss 20 threaded at its upper end as indicated at 21, this boss containing upper and lower chambers 22 and 23, respectively, separated by a conical valve-seat 24, with which a needle-valve 25 having threaded connection with the boss 20 as indicated at 26, coöperates. The chamber 22, through the medium of a passage 27 communicates with the left-hand section of the bore 11 (Fig. 2), at a point where the operation of the valve 14 will not affect the flow of oil in the passage; and the chamber 23 communicates with a passage 28 opening into the bore 11 between the valve-seat 13 and the plug 18. It will thus be seen from the foregoing that the desired back pressure for opening the valve 14 may be reëstablished beyond this valve at any time desired, should it for any reason fall below the minimum required for maintaining the valve 14 in open condition, as by extinguishing the flame at a burner without shutting off the supply, or a break in the pipe, by opening the valve 25, whereupon oil will flow through the conduits 27 and 28 and chambers 22 and 23 into the pipes beyond the valve 14, thus establishing the desired back-pressure for opening the valve and maintaining it in open condition. When such back-pressure has been established, it is desirable that the valve 25 be closed against its seat 24.

From the foregoing description it will be manifest that my invention may be used in connection with any fluid-conducting conduit, whether the fluid be oil, water, gas, air, or the like, where a back-pressure is maintained in the conduit under normal conditions, and thus I do not wish to be understood as intending to limit my invention to its use in connection with hollow-wire systems.

What I claim as new and desire to secure by Letters Patent is:

1. The combination with a conduit adapted to conduct fluid, of a valve-device interposed in said conduit formed with a seat, a valve coöperating therewith, and means coöperating with the back-pressure of fluid in said conduit, for maintaining the valve in unseated condition until such back-pressure becomes reduced below a predetermined degree.

2. The combination with a conduit adapted to conduct fluid, of a valve-device interposed in said conduit, comprising a seat, a valve coöperating therewith, and spring-means, operating in conjunction with the back-pressure of the fluid in the conduit, for maintaining said valve open until said back-pressure becomes reduced below a predetermined degree.

3. The combination with a conduit adapted to conduct fluid, of a valve-device interposed in said conduit formed with a seat, a valve coöperating therewith and opening toward the flow of fluid in said conduit, and means, coöperating with the back-pressure of fluid in said conduit, for maintaining said valve in unseated condition until such back-pressure becomes reduced below a predetermined degree.

4. The combination with a conduit adapted to conduct fluid, of a valve-device interposed in such conduit formed with a casing provided with a seat, a valve coöperating with said seat, a stop in said casing, and a spring operating against said stop and cooperating with the back-pressure of fluid in said conduit for maintaining said valve in unseated condition until such back-pressure becomes reduced below a predetermined degree.

5. The combination with a conduit adapted to conduct fluid, of a valve-device interposed in said conduit formed with a seat, a valve coöperating therewith, means, coöperating with the back-pressure of the fluid in said conduit, for maintaining the valve in unseated condition until such back-pressure becomes reduced below a predetermined degree, and a by-pass communicating at its opposite ends with said conduit on opposite sides of said valve.

6. The combination with a conduit adapted to conduct fluid, of a valve-device interposed in said conduit comprising a seat, a valve coöperating therewith, and adjustable means, coöperating with the back-pressure of the fluid in said conduit, for maintaining the valve in unseated condition until such back-pressure becomes reduced below a predetermined degree.

7. The combination with a conduit adapted to conduct fluid, of a valve-device interposed in said conduit comprising a seat, a valve coöperating therewith, and adjustable spring-means, operating in conjunction with the back-pressure of the fluid in the conduit, for maintaining said valve in open condition until said back-pressure becomes reduced below a predetermined degree.

8. The combination with a conduit adapted to conduct fluid, of a valve-device interposed in said conduit comprising a seat, a valve coöperating therewith and opening against the flow of fluid through said conduit, an apertured-plug secured to the valve-casing, a stop carried by said valve, and a spring interposed between said plug and stop and coöperating with the back-pressure of the fluid in the conduit for maintaining said valve in unseated condition until such back-pressure becomes reduced below a predetermined degree.

9. The combination with a conduit adapted to conduct fluid, of a valve-device interposed in said conduit formed with a seat, a valve coöperating therewith, means, coöperating with the back-pressure of the fluid in said conduit, for maintaining the valve in unseated condition until such back-pressure becomes reduced below a predetermined degree, and a valve-controlled by-pass communicating at its opposite ends with said conduit on opposite sides of said valve.

WILLIAM B. THOMPSON.

In presence of—
  A. U. THORIEN,
  R. A. SCHAEFER.